United States Patent
Hsieh (10) Patent No.: US 10,425,737 B2
(45) Date of Patent: Sep. 24, 2019

(54) WIRELESS AUDIO OUTPUT DEVICE

(71) Applicant: Airoha Technology Corp., Hsinchu (TW)

(72) Inventor: Ming-Yi Hsieh, Hsinchu (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 16/151,397

(22) Filed: Oct. 4, 2018

(65) Prior Publication Data

US 2019/0253800 A1 Aug. 15, 2019

Related U.S. Application Data

(60) Provisional application No. 62/629,725, filed on Feb. 13, 2018.

(30) Foreign Application Priority Data

Jun. 13, 2018 (TW) .............................. 107120410 A (51) Int. Cl.
| | |
|---|---|
| H04R 1/10 | (2006.01) |
| H04R 5/04 | (2006.01) |
| H04W 4/06 | (2009.01) |
| H04L 29/06 | (2006.01) |
| H04W 52/02 | (2009.01) |

(Continued)

(52) U.S. Cl.
CPC ............ *H04R 5/04* (2013.01); *H04L 12/189* (2013.01); *H04L 65/4076* (2013.01); *H04W 4/06* (2013.01); *H04W 52/0229* (2013.01); *H04L 2001/0093* (2013.01); *H04R 2420/07* (2013.01)

(58) Field of Classification Search
CPC ....................................................... H04R 1/10
See application file for complete search history.

(56) References Cited

U.S. PATENT DOCUMENTS

| | | | |
|---|---|---|---|
| 8,300,864 | B2 | 10/2012 | Mullenborn et al. |
| 8,768,252 | B2 | 7/2014 | Watson et al. |

(Continued)

FOREIGN PATENT DOCUMENTS

| | | |
|---|---|---|
| CN | 105284134 A | 1/2016 |
| CN | 101605293 B | 4/2016 |
| CN | 107172572 A | 9/2017 |

OTHER PUBLICATIONS

TIPO Office Action dated Apr. 16, 2019 in corresponding Taiwan application (No. 107120410).

*Primary Examiner* — Olisa Anwah
(74) *Attorney, Agent, or Firm* — McClure, Qualey & Rodack, LLP (57) ABSTRACT

The present invention discloses a wireless audio output device, including two audio output units. One of the audio output units is configured as a first role. The other one of the audio output units is configured as a second role. The first role is configured to establish a multicast link with a source device, to receive one or more media packets from the source device via the multicast link, and to perform bidirectional communication with the source device. The second role is configured to join the multicast link, to receive the one or more media packets from the source device via the multicast link, to perform unidirectional communication with the source device, and to perform unidirectional communication and/or bidirectional communication with the first role.

13 Claims, 5 Drawing Sheets

(51) Int. Cl.
*H04L 12/18* (2006.01)
*H04L 1/00* (2006.01)

(56) References Cited

U.S. PATENT DOCUMENTS

| | | | |
|---|---|---|---|
| 9,020,437 B2 | 4/2015 | Watson et al. | |
| 9,621,987 B2 * | 4/2017 | Watson | H04R 5/02 |
| 9,838,829 B2 | 12/2017 | El-Hoiydi | |
| 10,129,626 B1 * | 11/2018 | Jung | H04R 1/1016 |
| 2006/0221869 A1 * | 10/2006 | Chua | H04M 3/002 |
| | | | 370/260 |
| 2009/0274326 A1 * | 11/2009 | Jia | H04J 3/0682 |
| | | | 381/311 |
| 2013/0266152 A1 * | 10/2013 | Haynie | H04R 5/033 |
| | | | 381/80 |
| 2014/0064175 A1 * | 3/2014 | Feather | H04L 65/607 |
| | | | 370/312 |
| 2015/0092652 A1 * | 4/2015 | Ramamurthy | H04W 72/005 |
| | | | 370/312 |
| 2015/0334488 A1 * | 11/2015 | Kim | H04W 4/06 |
| | | | 381/2 |
| 2016/0073188 A1 * | 3/2016 | Linden | H04R 1/1025 |
| | | | 381/309 |
| 2017/0064433 A1 * | 3/2017 | Hirsch | H04R 1/1041 |
| 2017/0325016 A1 * | 11/2017 | Lee | H04R 1/1041 |
| 2018/0035246 A1 * | 2/2018 | Orescanin | H04R 1/1091 |

* cited by examiner

WIRELESS AUDIO OUTPUT DEVICE

This application claims the benefit of U.S. provisional application Ser. No. 62/629,725, filed Feb. 13, 2018 and the benefit of Taiwan application Serial No. 107120410, filed Jun. 13, 2018, the subject matters of which are incorporated herein by references.

BACKGROUND OF THE INVENTION

Field of the Invention

The invention relates to a wireless audio output device.

Description of the Related Art

In present society, information is majorly delivered with hearing and vision. These two channels are most important channels to carry knowledge and distribute information to people. Portable Electronic Devices, PEDs, are very popular to carry or transmit/receive information and re-produce as video, audio or voice to people, such as smartphones, tablets, audio players, earbuds and speakers. To make PEDs wireless is a trend and important topic to improve user experiments and help human knowledge easily to be accessed.

SUMMARY OF THE INVENTION

The purpose of the present invention is to provide a wireless audio output device.

An aspect of the present invention discloses a wireless audio output device, including two audio output units. One of the audio output units is configured as a first role. The other one of the audio output units is configured as a second role. The first role is configured to establish a multicast link with a source device, to receive one or more media packets from the source device via the multicast link, and to perform bidirectional communication with the source device. The second role is configured to join the multicast link, to receive the one or more media packets from the source device via the multicast link, to perform unidirectional communication with the source device, and to perform unidirectional communication and/or bidirectional communication with the first role.

The wireless audio output device provided by the present invention can support a source device which is a standard Bluetooth device. In other words, without changing the original operations of the source device, the wireless audio output device is able to be compatible with the source device.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
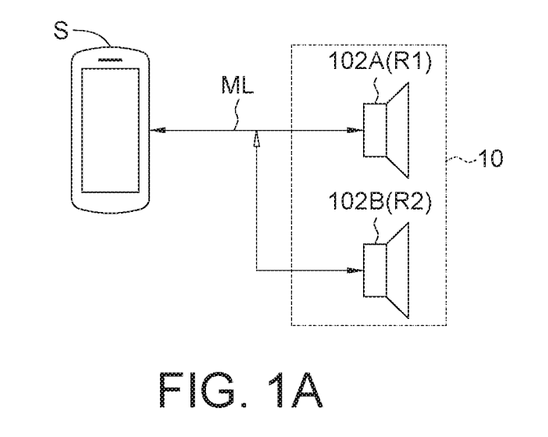
FIG. 1A shows a block diagram of a wireless audio output device according to the present invention.

Referring to FIG. 1A, FIG. 1A shows a block diagram of a wireless audio output device according to the present invention. The wireless audio output device 10 includes two audio output units 102A, 102B. In this embodiment, the wireless audio output device 10 may be, for example, wireless earbuds, and the audio output units 102A, 102B may be a left channel output and a right channel output of the wireless earbuds. In a general case, the audio output units 102A, 102B can be considered equivalent in structure and effect.

Figure 1B:
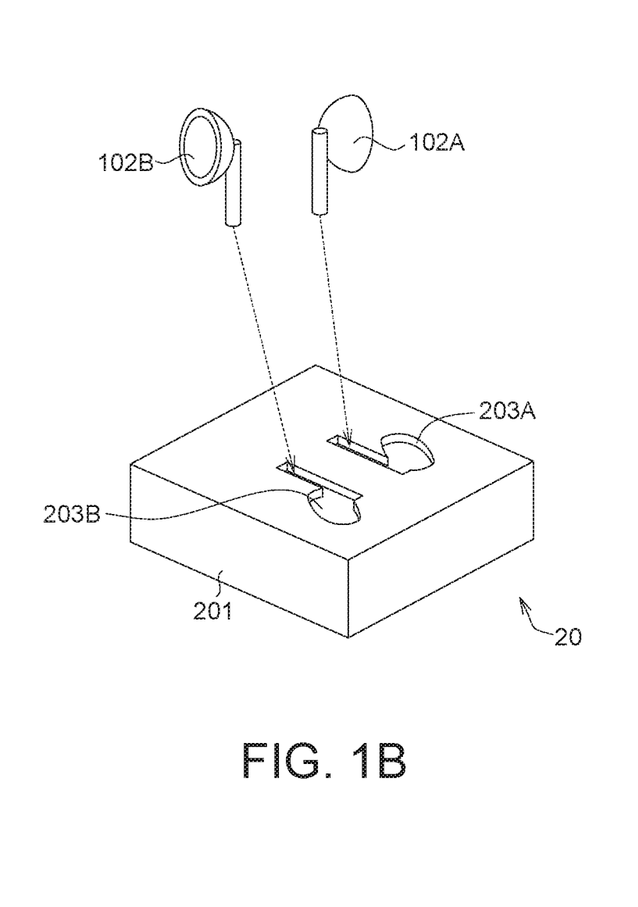
FIG. 1B shows a scheme diagram of a wireless audio output device and a storage module according to the present invention.

In an embodiment, the wireless audio output device 10 may be used with a storage module 20, as shown in FIG. 1B. The storage module 20 may include a case 201, two storage slots 203A, 203B, a power supply unit (not shown), one or more sensors (not shown) and one or more control units (not shown). The case 201 is used for containing and housing the elements of the storage module 20. The storage slots 203A, 203B may be used to store the audio output units 102A, 102B. The power supply unit can extend the storage module 20 to support charging function. For example, while the audio output units 102A, 102B are stored in the storage slots 203A, 203B, the power supply unit of the storage module 20 may charge the audio output units 102A, 102B. The sensors are used for sensing whether the audio output units 102A, 102B are stored in the storage slots 203A, 203B. When the sensors detect that the audio output unit 102A and/or audio output unit 102B are/is stored in the storage slot 203A and/or storage slot 203B, the control unit may transmit a power off command to the audio output units 102A, 102B automatically or in response to an operation of manually turning off a power switch by an user to let the audio output units 102A, 102B to enter a power off state or a non-operation state. When the audio output unit 102A and/or audio output unit 102B are/is taken out from the storage slot 203A and/or the storage slot 203B, the control unit(s) may know which of the taken audio output units are/is through the sensors. In an embodiment, the storage module 20 may further include a charging port. The charging port may be used for connecting to an external power source to charge the power supply unit by the external power source.

One of the audio output units 102A, 102B may be configured as a first role R1, and the other one of the audio output units 102A, 102B may be configured as a second role R2. In this embodiment, it is assumed that the audio output unit 102A is configured as the first role R1, and the audio output unit 102B is configured as the second role R2. For the convenience of illustration, hereafter, the audio output unit configured as the first role R1 is represented by the first role R1, and the audio output unit configured as the second role R2 is represented by the second role R2. Noted that, in some cases, the audio output units 102A, 102B may perform a role handover procedure for role swapping, and relative details may be described below.

The first role R1 is configured to establish a multicast link ML with a source device S. The "multicast link" described herein refers to a link which allows a transmitting node to transmit a message/packet to a particular plurality of receiving nodes in a single transmission. That is, a transmitting node can transmit data to a particular plurality of receiving nodes in a single transmission via the multicast link. In this embodiment, the multicast link ML is based on Bluetooth. The first role R1 may receive one or more media packets from the source device S via the multicast link ML, wherein said media packets may include Synchronous Connection-Oriented (SCO) packet, extended Synchronous Connection-Oriented (eSCO) packet, advanced audio distribution profile (A2DP) packet and the like. Voice data may be transmitted by using SCO packet or eSCO packet, and audio data may be transmitted by using A2DP packet. The first role R1 may also perform bidirectional communication with the source device S via the multicast link ML, expressed by two-way solid arrows in FIG. 1A. For example, a communication protocol between the first role R1 and the source device S may be handshake protocol. That is, the first role R1 and the source device S can transmit control signals to each other and respond the received control signals via the multicast link ML.

The second role R2 is configured to join the multicast link ML. The second role R2 may receive media packets from the source device S via the multicast link ML. The second role R2 may also perform unidirectional communication with the source device S via the multicast link ML, and unidirectional communication and/or bidirectional communication with the first role R1 via the multicast link ML, which is expressed by one side with a solid arrow and the other side with a hollow arrow in FIG. 1A. In other words, the second role R2 may receive control signals and media packets from the source device S via the multicast link ML, but does not need to respond. The second role R2 and the first role R1 may transmit control signals, packets to each other, and respond the received control signals and packets via the multicast link ML. Noted that, in the communication between the second role R2 and the first role R1, the recipient is not necessarily required to respond.

Figure 2:
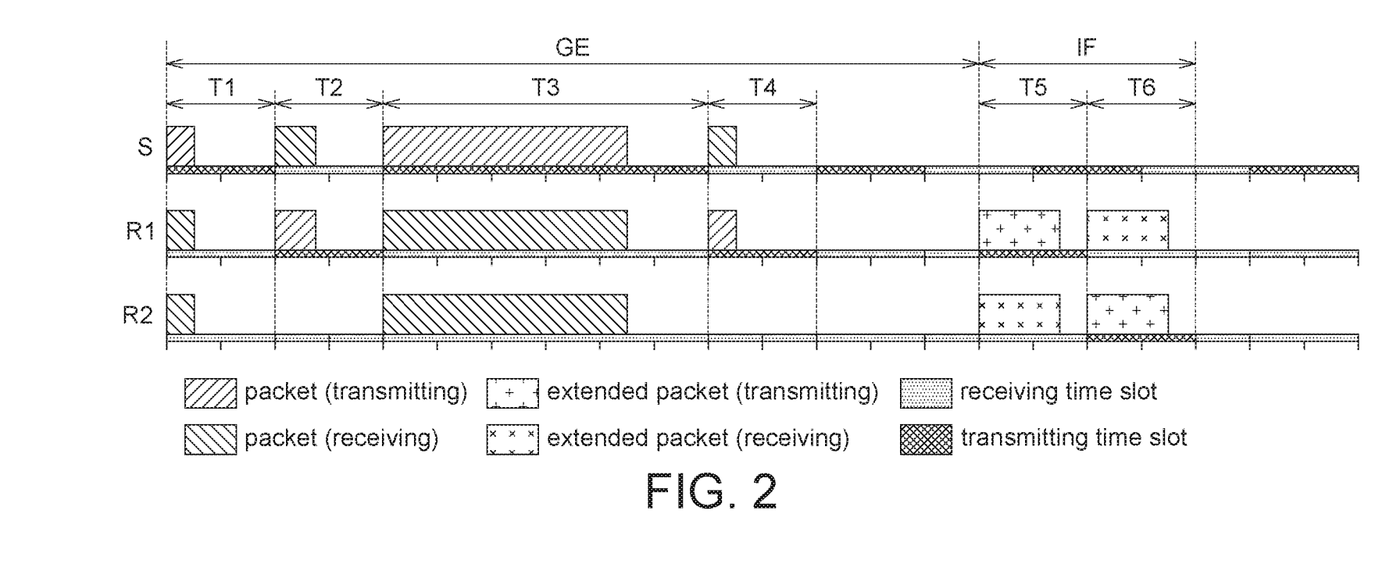
FIG. 2 shows a scheme diagram of the timing of packet transmit and receive according to an embodiment of the present invention.

Referring to FIG. 2, FIG. 2 shows a scheme diagram of the timing of packet transmit and receive according to an embodiment of the present invention. In this embodiment, the source device S is a standard Bluetooth device. That is, the time slot design of the source device S is according to (or follows to) the standard Bluetooth specification. On the other hand, the time slot design of the first role R1 and the second role R2 are based on the standard Bluetooth specification, and extended from the standard Bluetooth specification. It is assumed that the wireless audio output device 10 has completed pairing with the source device S, and the multicast link ML has been established. That is, the wireless audio output device 10 and the source device S can be considered as a packet transmission system. In time domain, the time axis of this packet transmission system may be divided into two types of packet transmission time, including a standard packet time GE and an extended packet time IF. During the standard packet time GE, the source device S can transmit control signals and media packets to the first role R1 and the second role R2; the first role R1 can receive control signals and media packets from the source device S, and transmit responses to the source device S in response to the received control signals and media packets; and the second role R2 can receive control signals and media packets from the source device S. During the extended packet time IF, the first role R1 and the second role R2 can exchange (e.g., transmit and/or receive) one or more extended packets. Details of the extended packets may be illustrated below.

For example, during time period T1, the source device S transmits a control signal (transmission (TX) slot), and the first role R1 and the second role R2 receive the control signal (receiving (RX) slot). During time period T2, the first role R1 transmits a response to the source device S based on the control signal (TX slot), and the source device S receives the response from the first role R1 (RX slot). During time period T3, the source device S transmits a media packet (TX slot), and the first role R1 and the second role R2 receive the media packet (RX slot). During time period T4, the first role R1 transmits a response to the source device S based on the received media packet (TX slot), and the source device S receives the response from the first role R1 (RX slot). Noted that, the second role R2 may not receive the response transmitted to the source device S, based on the control signal, by the first role R1 (RX slot).

During time period T5, the first role R1 transmits an extended packet (TX slot), and the second role R2 receives the extended packet (RX slot). During time period T6, the second role R2 transmits an extended packet (TX slot), and the first role R1 receives the extended packet (RX slot). It should be mentioned that when the first role R1 and the second role R2 exchange the extended packets, the start time of transmitting the extended packets may not be aligned with the start time of the receiving time slot (RX slot) used by the source device S. Therefore, the source device S may not receive the extended packets transmitted by the first role R1 and the second role R2, so that the source device S may be able to remain operations under standard Bluetooth specification. That is, the wireless audio output device 10 can support that the source device S is a standard Bluetooth device.

In general, the frequency band used by standard Bluetooth specification is 2402 MHz-2480 MHz, and this frequency band is divided into 79 channels, wherein each of the channels is 1 MHz in bandwidth. In this embodiment, during the standard packet time GE, the packets transmitted by the source device S and the first role R1 can trigger a frequency hopping mechanism to switch the channel being used. However, during the extended packet time IF, the extended packets transmitted by the first role R1 and the second role R2 may not trigger the frequency hopping mechanism.

Next, details of the extended packets will be explained.
The extended packets may include link setup packets, link update packets and link re-setup packets.

Figure 3A:
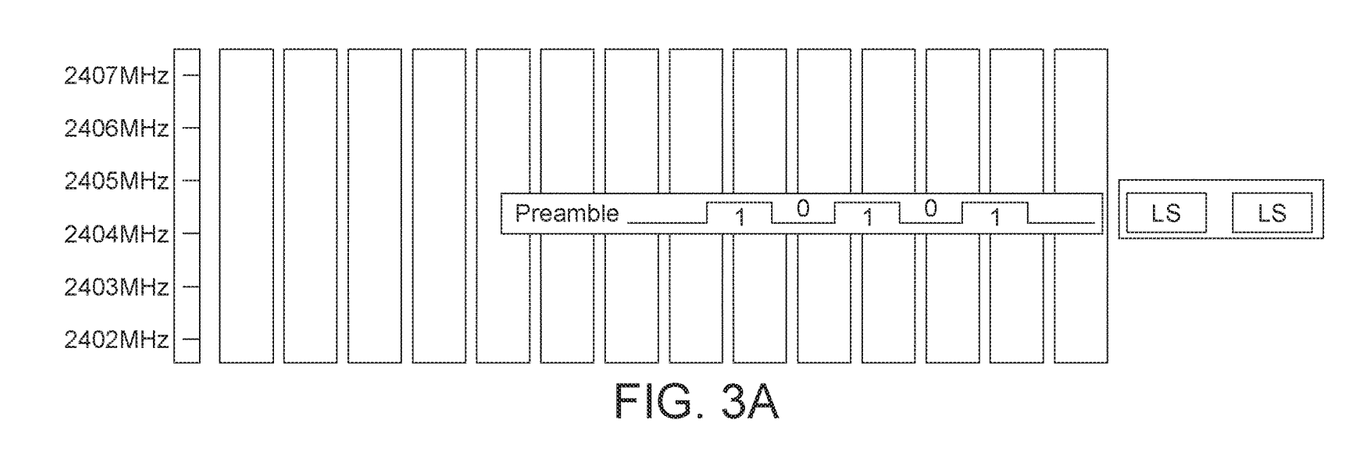
FIG. 3A shows a scheme diagram of a first role transmits a link setup packet.
Figure 3B:
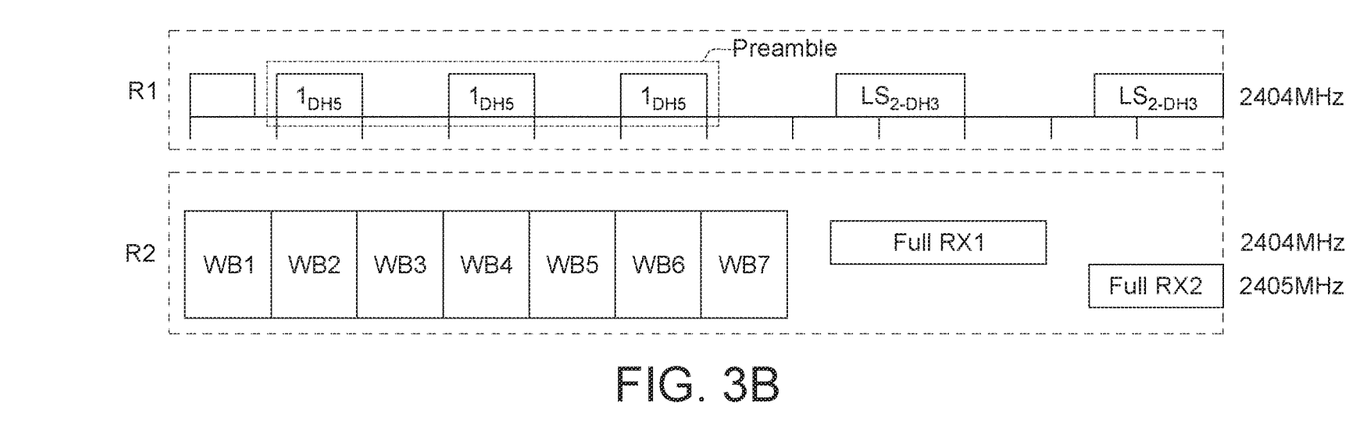
FIG. 3B shows a scheme diagram of a second role receives a link setup packet.

The link setup packet is transmitted by the first role R1, and is configured to help the second role R2 to find and join the multicast link ML. Referring to FIG. 3A, in an embodiment, the first role R1 may initially issue a link setup preamble (Preamble) and one or more link setup packets LS to the multicast link ML. More specifically, since the multicast link ML in this embodiment is established based on standard Bluetooth specification, the multicast link ML may use the plurality channels (each with 1 MHz in bandwidth) of the specific frequency band (e.g., 2402 MHz-2480 MHz), and the link setup preamble and the link setup packets LS may be issued to the channel currently used by the multicast link ML (in this example, 2404 MHz). The link setup preamble is, for example, a sequence of binary bits "10101", for example, a sequence of RF signals "10101", where "1" means strong RF signal and "0" means no RF signal or weak RF signal. In this embodiment, each strong RF signal may be implemented with a packet. Referring to FIG. 3B, the second role R2 may repeatedly perform wideband scanning (e.g., WB1~WB7) for the specific frequency band used by the multicast link ML. For example, the second role R2 scans multiple (for example, two) channels in the specific frequency band each time, during the first wideband scan WB1, until the channels of the specific frequency band are scanned once, and it is similar to wideband scanning WB2~WB7. Assuming that the link setup preamble and the link setup packets have been issued by the first role R1, the second role R2 may detect the sequence "10101" when scanning the channels 2404 MHz and 2405 MHz during wideband scanning WB3~WB7. Therefore, the second role R2 may determine that the link setup packets LS are issued to one of the channels 2404 MHz, 2405 MHz. Then, the second role R2 may turn on two full receiving time slot (full RX1, full RX2), wherein the full RX1 may try to receive the link setup packets LS from the channel 2404 MHz, and the full RX2 may try to receive the link setup packet LS from the channel 2405 MHz. By such approach, the second role R2 may be able to join the multicast link ML according to the content of the received link setup packet LS.

It should be mentioned that, in order to reduce searching time for searching the link setup preamble and the link setup packets, the above embodiment employs wideband scanning for searching. In some embodiments, the second role R2 may employ narrowband scanning for searching the channel which the link setup preamble and the link setup packets are issued to.

In some cases, for example, when the first role R1 does not establish the multicast link ML with the source device 5, the second role R2 may repeatedly perform wideband scanning for intending to join the multicast link ML, so that the power consumption of the wireless audio output device 10 is increased accordingly. To avoid the above problem, in an embodiment, when the multicast link ML does not established yet (e.g., the source device S cannot be detected by the first role R1), the first role R1 may establish a dummy link, wherein the dummy link may not correspond to any source device. The first role R1 may issue the link setup preamble and the link setup packets to the dummy link. The second role R2 may join the dummy link by an approach which is similar to the approach for joining the multicast link ML. Similarly, the first role R1 and the second role R2 may perform unidirectional communication and/or bidirectional communication via the dummy link, for example, exchanging (e.g., transmitting and/or receiving) of the extended packets.

Furthermore, the first role R1 may transmit a sleep notification to the second role R2 via the multicast link ML or the dummy link, to cause the second role R2 to enter a sleep mode. In the sleep mode, the second role R2 can be kept in a low power state. When a sleep counter is timed out, the second role R2 may leave the sleep mode, and be ready to receive the extended packets from the first role R1 or receive the packets from the source device S.

The link update packet is sent to the second role R2 from the first role R1. The link update packet includes state information of the first role R1. Said state information includes, for example, a current state of a state machine of the first role R1. Since the second role R2 may not receive the packets which are sent to the source device S from the first role R1 the second role R2 may not be able to absolutely know the current state of the first role R1. Therefore, the second role R2 may update the own state machine according to the link update packets. For example, when the source device S and the first role R1 jointly confirm that a task is completed (e.g., a call is ended or transmission of media packets is finished), the first role R1 may transmit the link update packets to the second role R2 to notify the second role R2 to release resource.

The link re-setup packet is sent to the second role R2 from the first role R1. The link re-setup packet is configured to request the second role R2 to disconnect (or leave) the link which is currently joined, and join another link after. In an example that the second role R2 has joined the dummy link established by the first role R1, if the first role R1 established the multicast link ML with the source device S when the source device S is detected by the first role R1, the first role R1 may transmit the link re-setup packet to the second role R2. In response to the link re-setup packet, the second role R2 may disconnect (or leave) the dummy link, and then join the multicast link ML in another example that the second role R2 has joined the multicast link ML established by the first role R1 and the source device S, if the first role R1 established a first multicast link (different from the multicast link ML) with a first source device (different from the source device S) when the first source device is detected by the first role R1, the first role R1 may transmit the link re-setup packet to the second role R2. In response to the link re-setup packet, the second role R2 may disconnect (or leave) the multicast link ML, and then join the first multicast link.

Figure 4:
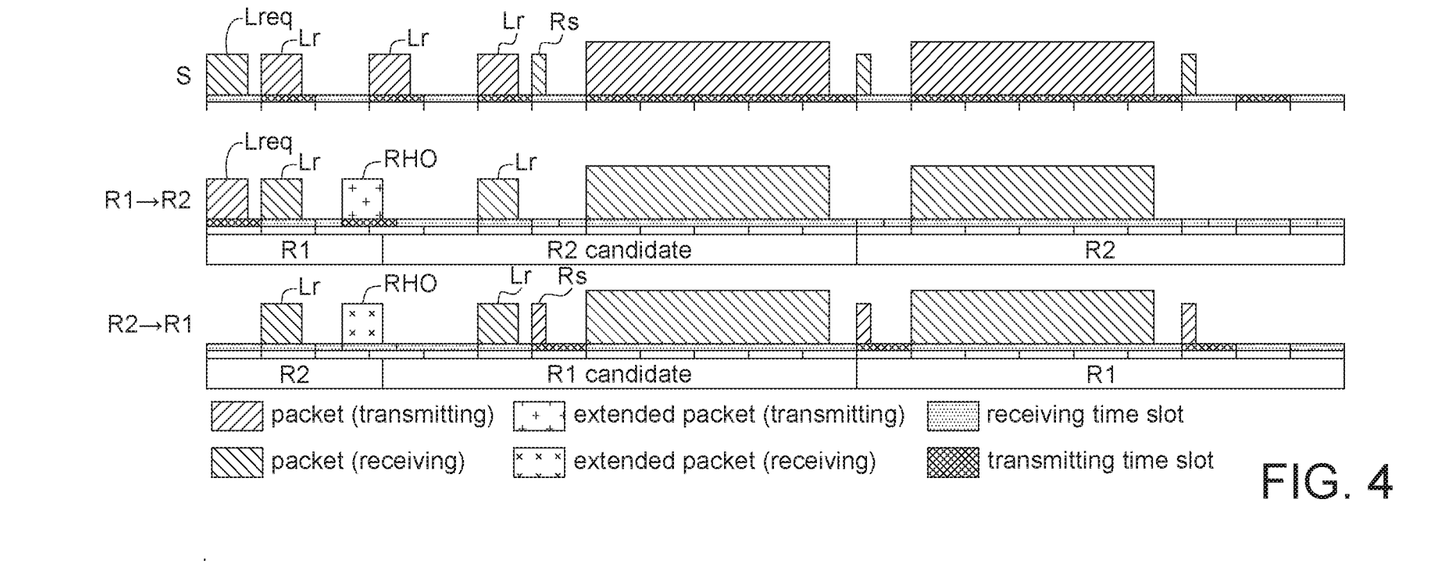
FIG. 4 shows a scheme diagram of a role handover procedure.

In some cases, the audio output units 102A, 102B may perform a role handover procedure in runtime (e.g., not in the sleep mode) to swap the roles. For example, it is assumed that the audio output unit 102A is configured as the first role R1, and the audio output unit 102B is configured as the second role R2. Referring to FIG. 4, when only the audio output unit 102B configured as the second role R2 is taken out from the storage module 20 by the user, the first role R1 may know that only the second role R2 is taken out by, for example, a notification from the storage module 20. Then, the first role R1 may transmit a control request Lreq to the source device S. When the control request is received, the source device S may send a control response Lr periodically (a number of control responses Lr may be sent) to the first role R1 and the second role R2 in a specific time interval. In response to the control response Lr, the audio output unit 102A configured as the first role R1 may send a role handover packet RHO to the audio output unit 102B. Then, the audio output unit 102A may be set as a second role candidate, and the audio output unit 102B may be set as a first role candidate. When the audio output unit 102B is set as the first role candidate, the audio output unit 102B may intend to respond the control response Lr transmitted by the source device S. If a response packet Rs transmitted by the audio output unit 102B is successfully received by the source device S, and what received by the audio output units 102A, 102B from the source device S subsequently are not the control response Lr, the audio output unit 102B may be set as the first role R1, and the audio output unit 102A may be set as the second role R2, so that the role handover procedure is completed. Otherwise, the audio output unit 102B may be set as the second role R2, and the audio output unit 102A may be set as the first role R1, so that the original setting is recovered. In addition, the audio output unit 102A configured as the second role candidate does not need to respond the control response Lr.

Noted that, whether the audio output unit 102A and/or 102B is taken out can be known by many kinds of sensing mechanism, and the approach described herein is one embodiment of those. In some other embodiments, sensors may be disposed in the audio output units 102A, 102B.

Figure 5:
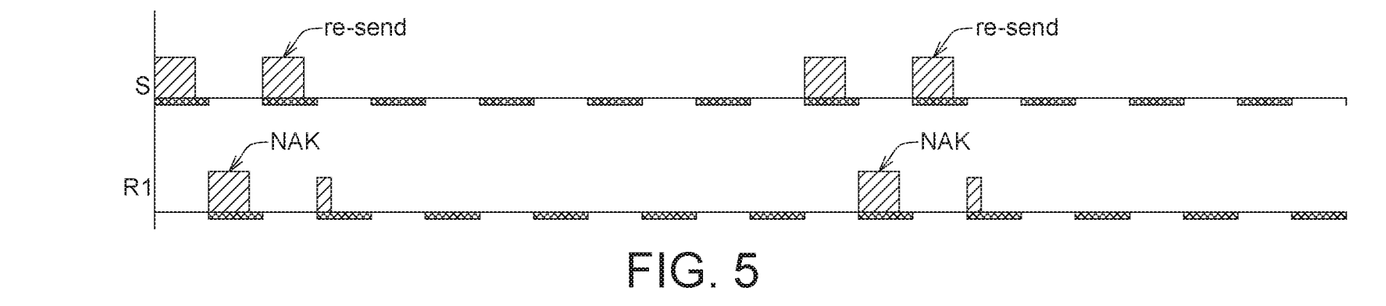
FIG. 5 shows a scheme diagram of recovery mechanism for extended Synchronous Connection-Oriented (eSCO) packet.

In an embodiment, when the first role R1 receives eSCO packets and/or control signals from source device S, the first role R1 may request the source device S to re-send said voice packets (eSCO packets) and/or control signals for a specific number of times. Referring to FIG. 5, after the first role R1 receives an eSCO packet and/or a control signal, the first role R1 may reply a "NAK" (Negative Acknowledgement) to the source device S. in response to the "NAK," the source device S may re-send the eSCO packet and/or the control signal, so that the first role R1 and the second role R2 may have two or more chances to receive said eSCO packets and/or control signals.

In an embodiment, the first role R1 may store the A2DP packets transmitted by the source device S into a buffer (disposed in the first role R1, but not shown). After the A2DP packets from the source device S are stored into the buffer, the first role R1 may transmit a buffer status report to the second role R2. The buffer status report is used to show the information of the A2DP packets stored in the buffer. The information of the A2DP packets includes, for example, sequence number, type, and size of the A2DP packets. The second role R2 may check the A2DP packets stored in a buffer of the second role R2 according to the buffer status report transmitted by the first role R1 to determine whether the A2DP packets received by the second role R2 are lost or incomplete. When the second role R2 determines that some of the A2DP packets are lost or incomplete, the second role R2 may send a recovery request to report the sequence numbers of the lost or incomplete A2DP packets to the first role R1. The first role R1 may send the corresponding A2DP packets according to the sequence numbers reported by the second role R2 to the second role R2. For example, in a transmission, the source device S transmits ten A2DP packets to the first role R1 and the second role R2. If the second role R2 determines that the A2DP packets of sequence numbers 2 and 5 are lost according to the buffer status report from the first role R1 the second role R2 may transmit the recovery request to ask the first role R1 to transmit the A2DP packets of the sequence numbers 2 and 5 to the second role R2 for recovery.

Figure 6:
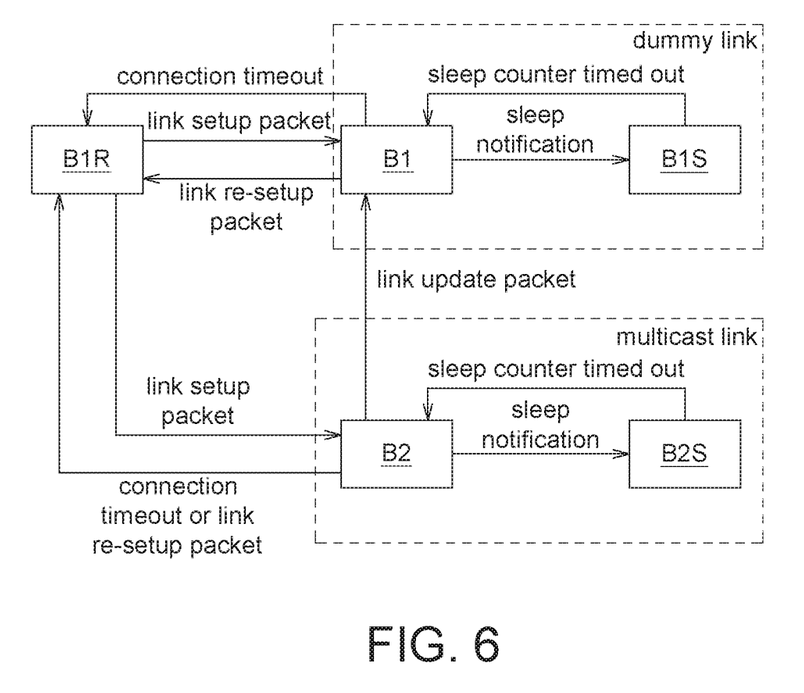
FIG. 6 shows an example of a state machine of an audio output unit.

Referring to FIG. 6, FIG. 6 shows an example of a state machine of an audio output unit, for example, an audio output unit configured as the second role R2. State [B1R]: the audio output unit may turn on the power and intend to join the multicast link or the dummy link; the audio output unit may enter state [B1] or state [B2] when the audio output unit receives the link setup packet. State [B1]: the audio output unit may be activated to receive the extended packet; the audio output unit may enter state [B1R] when connection timeout or after received the link re-setup packet; the audio output unit may enter state [B1S] after received the sleep notification. State [B1S]: the audio output unit may enter the sleep mode; the audio output unit may enter state [B1] when the sleep counter is timed out. State [B2]: the audio output unit may be activated to receive packet(s); the audio output unit may enter state [B1R] when connection timeout or after received the link re-setup packet; the audio output unit may enter state [B1] after received the link update packet; the audio output unit may enter state [B2S] after received the sleep notification. State [B2S]: the audio output unit may enter the sleep mode; the audio output unit may enter state [B2] when the sleep counter is timed out. The above state machine is merely exemplary, and not for purpose of limiting the present invention.

The wireless audio output device provided by the present invention can support a source device which is a standard Bluetooth device. In other words, without changing the original operations of the source device, the wireless audio output device is able to be compatible with the source device. Moreover, since the wireless audio output device provided by the present invention has a function to recover the lost packets, the quality of the output audio can be improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless audio output device, comprising:
two audio output units, wherein one of the audio output units is configured as a first role, and the other one of the audio output units is configured as a second role, wherein:
the first role, is configured to establish a multicast link with a source device, to receive one or more media packets from the source device via the multicast link, and to perform bidirectional communication with the source device via the multicast link; and
the second role, is configured to join the multicast link, to receive said media packets from the source device via the multicast link, to perform unidirectional communication with the source device via the multicast link, and to perform unidirectional communication and/or bidirectional communication with the first role via the multicast link.

2. The wireless audio output device according to claim 1, wherein the multicast link is based on Bluetooth link, and support the source device which is a standard Bluetooth device.

3. The wireless audio output device according to claim 1, wherein when the first role and the second role exchange one or more extended packets, a start time of transmitting the one or more extended packets is not be aligned with the start time of receiving time slots used by the source device.

4. The wireless audio output device according to claim 3, wherein the one or more extended packets comprise a link setup preamble and one or more link setup packets transmitted by the first role.

5. The wireless audio output device according to claim 4, wherein the link setup preamble and the one or more link setup packets are issued to the multicast link, and the second role scans a plurality of channel in a specific frequency band to receive the link setup preamble and the one or more link setup packets.

6. The wireless audio output device according to claim 3, wherein the one or more extended packets comprise one or more link update packets transmitted by the first role, the one or more link update packets includes a state information of the first role, and the second role synchronizes with the first role according to the one or more link update packets.

7. The wireless audio output device according to claim 1, wherein the first role is configured to establish a dummy link without the source device when the multicast link is not established, and the second role is further configured to join the dummy link to perform exchanging of one or more extended packets with the first role.

8. The wireless audio output device according to claim 7, wherein when the source device is detected by the first role after the dummy link is established, the first role establishes the multicast link, and transmits one or more link re-setup packets to the second role via the dummy link, and the second role disconnects the dummy link and joins the multicast link in response to the one or more link re-setup packets.

9. The wireless audio output device according to claim 1, wherein the first role is further configured to transmit a sleep notification to the second role to cause the second role to enter a sleep mode.

10. The wireless audio output device according to claim 1, wherein when a first source device is detected by the first role after the multicast link is established, the first role establishes a first multicast link, and transmits one or more link re-setup packets to the second role via the multicast link, and the second role disconnects the multicast link and joins the first multicast link in response to the one or more link re-setup packets.

11. The wireless audio output device according to claim 1, wherein the first role is further configured to transmit a role handover packet to the second role, and the first role and the second role perform a role handover procedure jointly for role swapping.

12. The wireless audio output device according to claim 1, wherein when the first role receives one or more Synchronous Connection-Oriented (SCO) packets and/or extended Synchronous Connection-Oriented (eSCO) packets of the one or more media packets, the first role requests the source device to re-send the one or more eSCO packets for a specific number of times.

13. The wireless audio output device according to claim 1, wherein when the first role receives one or more advanced audio distribution profile (A2DP) packets of the one or more media packets, the first role transmits a buffer status report to the second role, the second role transmits a recovery request to the first role according to the buffer status report, and the first role transmits at least one of the one or more A2DP packets to the second role according to the recovery request.

* * * * *